United States Patent [19]

Takakarhu et al.

[11] Patent Number: 5,195,654

[45] Date of Patent: Mar. 23, 1993

[54] METHOD FOR FEEDING A MUD-LIKE CATALYST INTO A POLYMERIZATION REACTOR

[75] Inventors: Jouni Takakarhu, Helsinki; Kari Sarantila, Porvoo, both of Finland

[73] Assignee: Neste Oy, Finland

[21] Appl. No.: 702,226

[22] Filed: May 17, 1991

[30] Foreign Application Priority Data

May 17, 1990 [FI] Finland ............................. 902453

[51] Int. Cl.$^5$ ............................................. G01F 11/00
[52] U.S. Cl. ...................................... 222/1; 137/597; 222/53; 222/636
[58] Field of Search ............... 22/1, 52, 53, 636; 137/597, 614.11

[56] References Cited

U.S. PATENT DOCUMENTS

| | | | |
|---|---|---|---|
| 3,227,312 | 1/1966 | Solvik et al. | 222/52 |
| 3,891,121 | 6/1975 | Stoneburner | 222/1 |
| 4,828,145 | 5/1989 | Raufast | 222/1 |
| 5,020,689 | 6/1991 | Eitner, Jr. et al. | 222/1 |

Primary Examiner—Andres Kashnikow
Assistant Examiner—Joseph A. Kaufman
Attorney, Agent, or Firm—Steinberg & Raskin

[57] ABSTRACT

The invention relates to a method and device for feeding a mud-like catalyst mixture into a polymerization reactor. The catalyst mixture is fed from a container into a batching space of a feeder connected thereto, from which channel the catalyst mixture is further fed by batches into the polymerization reactor by the use of the pressure of a medium fed into the feeder. In accordance with the invention, after each catalyst batch fed into the polymerization reactor, the medium is substantially removed from the batching space of the feeder by leading the medium via an outlet channel into a space between two on/off valves before filling the batching space with a new catalyst batch.

6 Claims, 1 Drawing Sheet

METHOD FOR FEEDING A MUD-LIKE CATALYST INTO A POLYMERIZATION REACTOR

BACKGROUND OF THE INVENTION

Catalysts are used in many chemical reactions. One such chemical reaction is the polymerization of olefines, wherein catalysts are fed, e.g., into a polymerization reactor as a suspension in some hydrocarbon medium. In such process, the catalyst mixture is usually fed from a separate feeding container as a mud-like catalyst suspension by means of a feeding or batching device into the polymerization reactor. Since polymerization processes are often continuous, it must be possible to continuously batch an exactly desired amount of the catalyst into the polymerization reactor. Since catalysts are often relatively thick mud-like mixtures, it sets high requirements for the operation and operational reliability of the batching device.

Such a catalyst feeding system has previously been described e.g. in U.S. Pat. No. 3,227,312. Therein is described a feeding device comprising a rotatable plug valve having two through channels which do not communicate with each other. As the plug rotates, each channel is alternately in contact with the catalyst feeding container, whereby it is filled with the catalyst mixture. As the plug further rotates, the channel filled with the catalyst comes into a position in which it communicates both with the polymerization reactor and a transfer medium block, and the medium coming from the block transports the catalyst from an inlet channel into the polymerization reactor. At the same time, another inlet channel has in turn rotated in such a way that it communicates with the catalyst feeding container and is thus filled with the catalyst mixture.

According to the operating principle of the feeding device of such a position that it communicates with the catalyst feeding container, it is simultaneously filled with pure transfer medium. This is also a disadvantage, since it further makes the flowing of the mud-like catalyst mixture into the inlet channel more difficult. As a consequence, the filling of the inlet channels slows down or the inlet channels are filled only partially, and furthermore, the feeding capacity of the feeding device decreases, and at the same time, the production rate of the polymerization process decreases.

SUMMARY AND OBJECTS OF THE INVENTION

An object of the present invention is to provide a method and a device which avoid the disadvantages mentioned above.

The method according to the present invention is thus related to a device and process wherein for speeding up the flowing of the catalyst mixture, the transfer medium is removed from the inlet channel by leading the medium into an outlet space communicating with the lower end of the batching channel and located between two successively operating outlet valves of the "on/off" type. After the first outlet valve has opened and the second valve is closed, the transfer medium transfers from the batching space of a plug valve by the volume of the outlet space between the valves, after which the second outlet valve opens for leading out the medium as the first valve closes.

Another object of the invention is to provide a device for feeding a mud-like catalyst mixture by batches from the container of the polymerization reactor as a continuous process.

In the present method for feeding a mud-like catalyst mixture into a polymerization reactor, a catalyst mixture is fed from a container into a batching space of a feeding device in contact with the container and from which container the catalyst mixture is further fed by batches into the polymerization reactor by means of a transfer medium.

The device according to the present invention for feeding a mud-like catalyst mixture by batches from the container of the polymerization reactor as a continuous process comprises a four-way valve provided with a rotatable plug, in which are formed one or more through borings in such a way that the borings do not communicate with each other, and on the frame of which device are formed crosswise through holes. The first hole is formed of a first inlet channel connecting the container to the plug of the device, which channel on the opposite side of the plug continues as a first outlet channel out of the frame. The second hole is formed of a second inlet channel connected to the catalyst-mixture transfer-medium feeding line. On the opposite side of the plug, the second outlet channel continues as a channel connected to a reactor line entering the polymerization reactor.

The device according to the invention further comprises an exhaust space formed by two valves of the on/off type and a tube located therebetween which is connected to said first outlet channel, whereby said valves operate sequentially so that when the borings come to said first outlet channel and the second valve is closed, the first valve opens and allows the catalyst transfer medium in the boring to flow into the tube, after which the first valve closes and a second valve opens for leading out the transfer medium.

By means of the inventive method, the transfer medium can thus be removed from the batching channel, whereby the mud-like catalyst immediately descends in the empty inlet channel. The cycle of the feeding device can thus be essentially shortened and the feeding rate can thereby be increased.

The inventive method preferably utilizes quickly opening and closing valves of the on/off type, whose function is coupled to the rotational speed of the feeding valve plug. When the plug rotates into such a position that the inlet channel filled with transfer medium comes to the block leading to the feeding container, the following sequence is started. The first exhaust valve opens first and allows the transfer medium to exit from the feeding-valve batching channel by the volume between the outlet valves, whereby the channel is simultaneously filled with the mud-like catalyst. The first exhaust valve then closes and the second exhaust valve opens and allows the pure transfer medium, now vaporizing at a lower pressure, to enter the transfer-medium outlet tube, along which it can be led e.g. into a torch. Finally, the second exhaust valve closes.

The volume of the space between the exhaust valves is usefully dimensioned such that it corresponds to the volume of the inlet channel of the catalyst feeding valve. However, this volume can also be slightly smaller or larger than the volume of the inlet channel of the catalyst feeding valve. The upper limit for the volume of the above-mentioned space is mainly determined, e.g., by the fact of whether the catalyst is allowed to travel out of the system along with the exhaust blowing and how much. The timing of the opening and closing moments of the exhaust valves naturally depends on the rotational frequency of the feeding valve.

In the method according to the invention, the feeding plug can have one or more inlet channels, and in all cases, the capacity of the feeding device according to the U.S. Pat. No. 3,227,312 can even be quadrupled. There are preferably at least two channels, but several channels can also be used.

BRIEF DESCRIPTION OF THE DRAWINGS

The invention is next described in detail with reference to the accompanying drawings, which are illustrative of embodiments of the invention and are not meant to limit the scope of the invention as encompassed by the claims.

DETAILED DESCRIPTION OF THE PREFERRED EMBODIMENTS

Figures 1, 2:
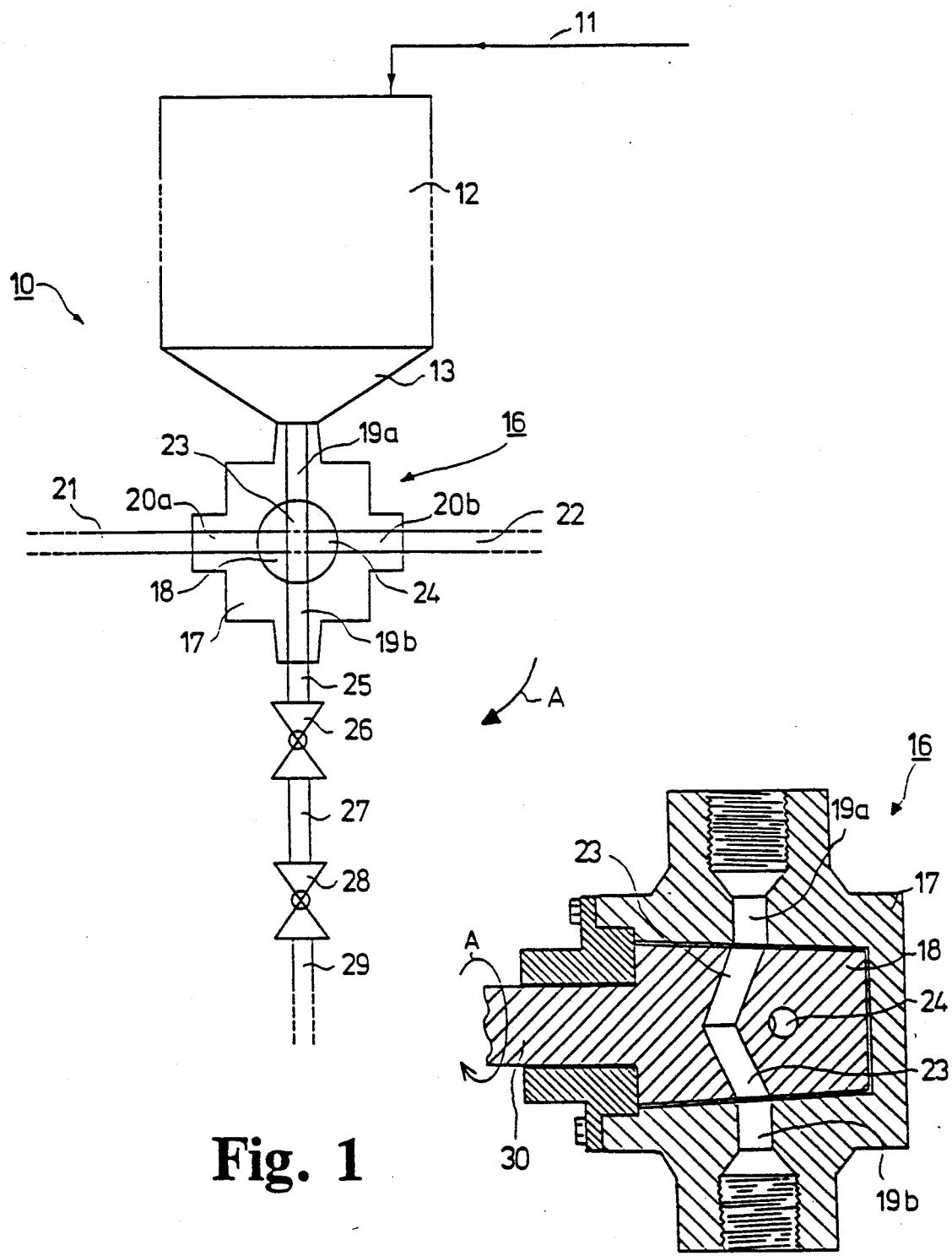
FIG. 1 is a side view showing the catalyst feeding device according to the present invention.
FIG. 2 is a cross-sectional view of the catalyst feeder according to the present invention.

In the catalyst feeding device 10 of FIG. 1 and 2, the catalyst mixture is fed along a feeding line 11 into a feeding container 12, which can also be provided with a mixture device (not shown). To a lower end 13 of the feeding container 12 is connected a catalyst feeder 16, with which the catalyst mixture is fed into a polymerization reactor.

The catalyst mixture used in the system is mud-like, and it consists of small particles. The catalyst can be e.g. chrome-based so that the chrome is absorbed on the surface of the particles. Accordingly, said catalyst mixture is run from the mixing container 12 into the catalyst feeder 16 partly by means of gravitational force and partly, if desired, also by means of overpressure maintained in the mixing container 12.

The catalyst feeder 16 comprises a plug valve, which in turn comprises a frame 17 of the feeder and a plug 18 fitted in a boring formed on the frame 17 and rotated by means of a shaft 30. Borings or channels are formed on the frame 17 of the catalyst feeder 16 feeder through and crosswise in such a way that the first boring comprises a first inlet channel 19a connecting the lower end 13 of the mixing container 12 to the plug 18 of the feeder as well as a first outlet channel 19b coaxial with the first inlet channel 19a.

The second boring in turn comprises a second inlet channel 20a, to which is connected a catalyst-mixture transfer-medium feeding tube 21, a second outlet channel 20b extending coaxially with the inlet channel 20a on the opposite side of the plug 18 of the feeder, which is connected to a reactor line 22 leading to the polymerization reactor.

On the plug 18 of the feeder are in turn formed crosswise through borings 23, 24, which are arranged on the plug 18 in such a way that the first boring 23 and the second boring 24 extend laterally with respect to the center axis of the plug 18 through the plug 18, but are yet not in contact with each other. When the plug 18 is thus rotated on the frame 17 of the feeder in a rotational direction A, the borings 23, 24 formed on the plug 18 alternately connect with each other, on one hand, the first inlet channel 19a and the first outlet channel 19b, and on the other hand, the second inlet channel 20a and the second outer channel 20b.

The plug 18 is fixed to a shaft (not shown) connected to a actuator, by means of which the plug 18 is cyclically rotated during the process. Any suitable actuator can be used as an actuator.

When the process is in operation, the plug 18 is thus continuously rotated by 90 degree increments. In the Figures of the drawings is shown a situation where the plug 18 has turned into position, in which the first boring 23 in the plug 18 has turned to connect the first inlet channel 19a to the first outlet channel 19b. Correspondingly, the second boring 24 of the plug 18 is then in position to connect the second inlet channel 20a to the second outlet channel 20b.

In the position shown in FIG. 1, the catalyst mixture thus flows from the mixing container 12 via gravitational force from the first inlet channel 19a to the first boring 23 of the plug 18 so that the first boring 23 is entirely filled with the catalyst mixture. Similarly, in the situation shown in FIG. 1, medium is fed from the medium feeding line 21 to the second inlet channel 20a of the feeder, from which the medium passes through the second boring 24 of the plug 18 to the second outlet channel 20b and then further via the reactor line 22 to the polymerization reactor.

Transfer media typically used in such processes include propane, butane, hexane, pentane and the like.

When the plug 18 is rotated from the situation shown in FIG. 1 in the rotational direction A by 90°, the first boring 23 of the plug 18 connects the second inlet channel 20a of the feeder to the second outlet channel 20b, and correspondingly, the second boring 24 connects the first inlet channel 19a to the first outlet channel 19b. Then, the medium fed from the medium feeding line 21 to the second inlet channel 20a runs the catalyst mixture in the first boring 23 along with it into the polymerization reactor.

Similarly, a new batch of the catalyst then leaves from the mixing chamber 12 for the second boring 24 in the plug 18.

In the solutions of prior art, a considerable problem related to the batching of the catalyst mixture in the polymerization reactor formed by the fact that the borings 23, 24 in the plug 18, which determine the quantity of the catalyst batch entering the polymerization reactor at every 90° turn, cannot freely and sufficiently rapidly be filled, since as the boring 23 or 24 turns to the first inlet channel 19a, the inlet channel 19a is filled with the catalyst-mixture transfer medium.

In accordance with the present invention, this problem has been eliminated and solved as follows.

An outlet tube 25 connected to the first outlet channel 19b is additionally provided with two valves 26, 28 of the on/off type, which are coupled to each other via a tube section 27. The volume of the tube section 27 is approximately the same as that of the borings 23, 24 formed on the plug 18.

The valves 26 and 28 provide an important improvement in the operation and the feeding capacity of the feeding device 10. When the plug 18 of the feeder is started to turn from the position shown in FIG. 1 in the direction of the arrow A, the first boring 23 of the plug is filled with the catalyst mixture and the second boring 24 is filled with the catalyst-mixture transfer medium. When the plug 18 turns into a position in which the second boring 24 comes to the outlet channel 19b, the following sequence begins: the valve 26 opens, and the medium in the boring 24 is transferred into the tube 27 located between the valves 26 and 28. Since the volume of the tube 27 approximately corresponds to the volume of the boring 24 and since the tube 27 is maintained at a low pressure, the tube 27 is filled with the medium and the boring 24 correspondingly empties of the medium. The valve 26 then closes and the valve 28 opens and lets the medium flow out into a tube 29, via which the medium transfers at a low pressure in an evaporated state e.g. into a torch. The valve 28 then closes and the sequence is repeated as the boring 23 comes to the outlet channel 19b.

As mentioned above, the volume of the tube 27 between the valves 26 and 28 is dimensioned such that it corresponds to the volume of the inlet channels of the catalyst feeding valves, but said volume can also be slightly smaller or greater than this. The timing of the opening and closing moments of the valves 26 and 28 is naturally adjusted according to the revolutions of the plug 18.

In the method and device according to the invention, the plug 18 can be provided with one or more borings, and in all cases, the capacity of the feeding device according to U.S. Pat. No. 3,227,312 is greatly increased, and can even be quadrupled. However, there are preferably two channels.

It is to be understood that the invention is not limited to the illustration described and shown herein, which are deemed to be merely illustrative. Many other variations of the present invention would be obvious to those skilled in the art, and are contemplated to be within the scope of the appended claims.

What is claimed is:

1. A method for feeding a mud-like catalyst mixture into a polymerization reactor, comprising
    feeding a catalyst mixture from a container into a feeder connected thereto, said feeder comprising a plug valve having borings adapted to be continuously rotated to alternately connect a first inlet channel connected to a lower end of said container to a first outlet channel, and a second inlet channel for a catalyst-mixture transfer medium to a second outlet channel leading to said polymerization reactor,
    batchwise filling a first one of said borings with said catalyst mixture transfer medium while at the same time batchwise filling a second one of said borings with said catalyst mixture, and feeding said catalyst mixture by batches into said polymerization reactor by means of pressure of said transfer medium fed into said feeder,
    providing an outlet space for said first outlet channel and providing said outlet space with first and second on/off valves coupled to each other via a outlet space,
    opening said first on/off valve and closing said second on/off valve, thereby removing said transfer medium from one of said bores into said outlet space, and thereafter
    opening said second on/off valve for leading out said transfer medium as said first on/off valve closes.

2. A method according to claim 1, further comprising adjusting the volume of said outlet space such that said volume of said outlet space corresponds to the volume of said borings.

3. A method according to claim 1, further comprising regulating said first and said second on/off valves such that the opening and closing of said first and said second on/off valves is adjusted according to the rotation of said plug valve.

4. A device for feeding a mud-like catalyst mixture by batches from a container of a polymerization reactor as a continuous process, comprising
    a catalyst feeder comprising a frame and a plug valve provided with a rotatable plug fitted in one or more borings formed on said frame,
    a first crosswise channel formed on said frame comprising a first inlet channel connecting said container to a side of said plug, said first crosswise channel further comprising a first outlet channel on an opposite side of said plug, said first outlet channel leading out of said frame,
    a second crosswise channel formed on said frame comprising a second inlet channel connected to a catalyst-mixture transfer medium feeding line on a side of said plug, said second crosswise channel further comprising a second outlet channel on an opposite side of said plug, said second outlet channel connected to a reactor line entering a polymerization reactor,
    an exhaust space connected to said first outlet channel, said exhaust space comprising first and second on/off valves and a tube located between said first and second on/off valves, said valves operating sequentially so that when said borings align with said first outlet channel and said second on/off valve is closed, said first on/off valve opens and allows the catalyst transfer medium in said boring to flow into said tube, after which said first valve closes and said second valve opens for leading out the catalyst transfer medium, said opening and closing of said first and second on/off valves being regulated according to the rotation of said plug.

5. A device according to claim 4, wherein said plug has two or more borings.

6. A device according to claim 4, wherein the volume of said tube corresponds to the volume of said borings.

* * * * *